(12) United States Patent
Song et al.

(10) Patent No.: US 6,569,475 B2
(45) Date of Patent: May 27, 2003

(54) PROCESS FOR MYCELIAL CULTURE USING GRAIN

(75) Inventors: Jae-Mahn Song, #B-401, Songnae Apt., 558 Songnae-2-dong, Sosa-gu, Bucheon-city, 422-042 Kyunggi-do (KR); Se-Youn Han, Incheon (KR); Yun-Sun Na, Seoul (KR)

(73) Assignees: Jae-Mahn Song, Bucheon (KR); C.A. Biotech Co., Ltd., Bucheon (KR)

( * ) Notice: Subject to any disclaimer, the term of this patent is extended or adjusted under 35 U.S.C. 154(b) by 0 days.

(21) Appl. No.: 09/971,004

(22) Filed: Oct. 5, 2001

(65) Prior Publication Data

US 2002/0041917 A1 Apr. 11, 2002

(30) Foreign Application Priority Data

Oct. 6, 2000 (KR) ........................................ 2000-58805
Jun. 21, 2001 (KR) ........................................ 2001-35247

(51) Int. Cl.$^7$ .............................. A23L 1/28; C12N 1/14; A01G 1/04
(52) U.S. Cl. ...................... 426/44; 426/640; 435/256.8
(58) Field of Search ............................. 426/44, 53, 640, 426/52, 655, 656, 618; 435/254.1, 256.8; 424/489, 93.5, 195.1, 520, 114

(56) References Cited

U.S. PATENT DOCUMENTS

| | | | | |
|---|---|---|---|---|
| 3,984,572 A | * | 10/1976 | Sakaki et al. ................. | 426/2 |
| 4,059,919 A | * | 11/1977 | Green .......................... | 422/39 |
| 4,281,021 A | * | 7/1981 | Iizuka et al. ................. | 426/102 |
| 4,370,351 A | * | 1/1983 | Harper ......................... | 426/49 |
| 4,776,872 A | * | 10/1988 | Mulleavy et al. ............ | 426/532 |
| 4,808,419 A | * | 2/1989 | Hsu ............................. | 426/11 |
| 6,298,598 B1 | | 10/2001 | Wach et al. | |

FOREIGN PATENT DOCUMENTS

| | | |
|---|---|---|
| EP | 1 130 007 | 9/2001 |
| JP | 61-187750 | * 8/1986 |
| JP | 62-143665 | * 6/1987 |
| WO | WO 00/65029 | 11/2000 |

* cited by examiner

*Primary Examiner*—Keith Hendricks
(74) *Attorney, Agent, or Firm*—Gary M. Nath; Todd L. Juneau; Sheldon M. McGee

(57) ABSTRACT

Disclosed are a method for culturing mushroom mycelia using grains, a culture product, and use of the culture product. Edible or medicinal mushroom mycelia are inoculated and cultured in solid media made of grains. Induction of the cultured mushroom mycelia to undergo autolysis produces autolysates rich in antitumorigenic and other medicinally useful materials. The squeezing of the autolysates produces a liquid filtrate, leaving a paste. The filtrate is concentrated for use in foods or medicines. The paste is processed into a nutrient-rich gruel or other foods.

7 Claims, 2 Drawing Sheets

PROCESS FOR MYCELIAL CULTURE USING GRAIN

BACKGROUND OF THE INVENTION

1. Field of the Invention

The present invention relates to a method for culturing mushroom mycelia, a culture product and uses of the culture product. More particularly, the present invention relates to the induction of mushroom mycelia cultured in solid media made of grains to undergo autolysis, the autolysates of mushroom mycelia, and their uses in foods and medicines.

2. Description of the Prior Art

For their medicinal or healthful effects, many mushroom mycelia have attracted keen attention. Thus far, for use as materials of foods and medicines, specific ingredients have been prepared through separation, extraction and filtration from mushroom fruit bodies or mycelia cultured in broths. However, such a series of preparation procedures requires significant time and cost.

Recently, there has been developed a culturing method using grains as culture media for mushroom mycelia. After the culturing of mushroom mycelia, the grain media can be dried for use in foods. When this method is employed, however, the useful components contained in mushrooms cannot be suitably utilized.

SUMMARY OF THE INVENTION

The intensive and thorough research into mushroom mycelium culture, conducted by the present inventors aiming to efficient production and utility of useful mushroom components, resulted in the finding that the induction of mushroom mycelia to undergo autolysis makes it easy to obtain medicinally useful materials, leading to the present invention.

Therefore, it is an object of the present invention to provide a method for culturing mushroom mycelia by which medicinally useful materials can be obtained effectively and with ease.

It is another object of the present invention to provide autolysates of mushroom mycelia, useful as materials for functional foods.

It is a further object of the present invention to provide the use of autolysates of mushroom mycelia as materials for functional foods.

Based on the present invention, the above objects could be accomplished by inoculating edible or medicinal mushroom mycelia in solid media made of grains, rooting the mycelia into the solid media, and inducing the mycelia to undergo autolysis to give autolysates which are useful for the preparation of functional foods or medicines.

DETAILED DESCRIPTION OF THE INVENTION

In the present invention, grains such as rice, barley, and the like are prepared into solid media into which mushroom strains are inoculated. After the culturing of the mushroom mycelia, they are induced to undergo autolysis. The autolysates thus obtained are squeezed to give a liquid which is then concentrated for use in foods or medicines. The paste left after the squeezing process is dried and powdered for use in functional foods.

Below, culturing of mushroom mycelia will be described in conjunction with the accompanying drawings.

Figure 1:
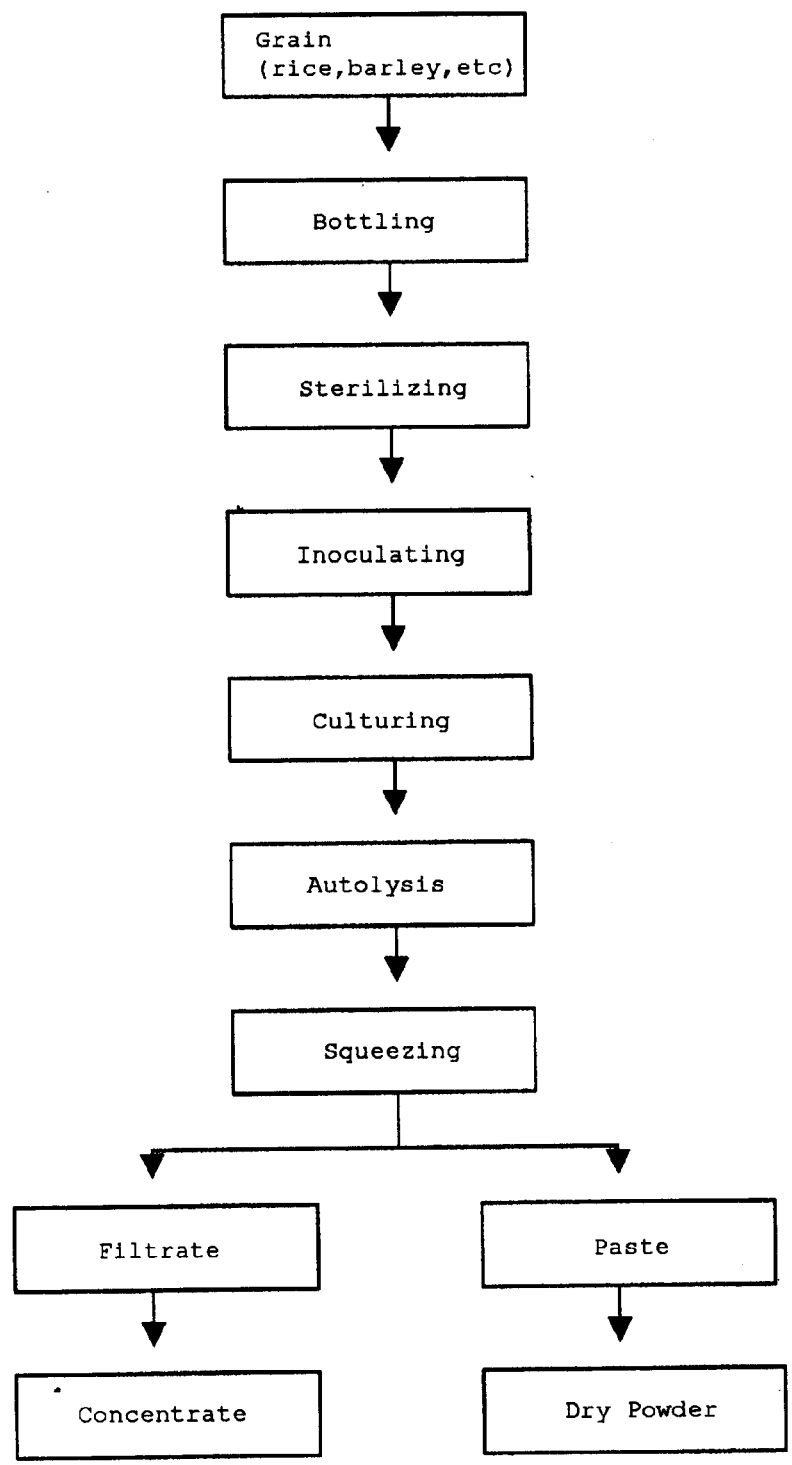
FIG. 1 is a flow chart illustrating the production of edible and medicinal mushroom mycelia in solid media made of grains.

With reference to FIG. 1, the following processes are schematically illustrated.

First Step: Preparation of Solid Media from Grains

Rice is boiled or soaked in two or three equivalents of water. The boiled or soaked rice is placed in a culture vessel which is then sealed and sterilized by autoclaving for 15 to 30 min. The vessel was cooled in order to use the rice as a solid medium.

Available as a solid medium for culturing mushroom mycelia in the present invention is any grain which is selected from the group consisting of rice, glutinous rice, barley, wheat, millet, glutinous sorghum, glutinous hog millet, Job's-tears, red bean, beans and corn. No limitation is imposed on the culture vessel, but preferable is a bottle-shaped vessel.

Second Step: Inoculating and Culturing of Mushroom Mycelia

On a clean bench, mushroom mycelia are inoculated into the sterilized culture medium. The inoculum may be taken from an agar plate or a broth. The inoculated mushroom mycelia are cultured in an incubator maintained at 20 to 30° C. for 15 to 30 days.

Exemplified by *Coriolus versicolor, Ganoderma lucidum, Schizophyllum commune, Peurotus ostreatus, Peurotus sajor-caju, Lentinus edodes* (Berk), *Flammulina velutipes,* Auricularia spp., and *Pholiota nameko*, any mushroom may be used in the present invention if it is edible and has medicinal properties.

Third Step: Induction of Mushroom Mycelia to Undergo Autolysis

The mushroom mycelia rooted into the solid medium within the culture vessel are induced into autolysis by knocking the culture vessel 5 to 20 times and treating the culture vessel at 45 to 55° C. for 24 to 48 hours.

Fourth Step: Squeezing of Autolysate

Autolysates thus obtained are squeezed to give a liquid which is then concentrated under vacuum or by heating.

Fifth Step: Drying of Paste

The paste left after the squeezing of the autolysates is dried to powder.

The liquid concentrate and the paste powder are used as materials for functional foods or medicines.

In the autolysates of mushroom mycelia obtained according to the present invention are present anti-tumorigenic polysaccharides such as exopolysaccharides and $\beta$-D-glucan, as well as the hydrolysates of grains provided by the activity of scores of hydrolytic enzymes, such as cellulases, laccases, lipases, polygalacturonases, proteases, and the like. Further, deodorizing components are found in the autolysates. Therefore, the autolysates can be used for the preparation of functional foods, medicines, and feedstuffs.

A better understanding of the present invention may be obtained in light of the following examples which are set forth to illustrate, but are not to be construed to limit the present invention.

EXAMPLE 1

Culturing of Mushroom Mycelia in Solid Medium Containing Grains and Production of Autolysate Experimental Example 1
Culturing of Mushroom Mycelia in a Solid Medium Containing Rice and Production of Autolysate 500 g of rice was boiled in 1.5 liters of water. 1.9 kg of the boiled rice was placed in a culture vessel and autoclaved for 20 min. *Coriolus versicolor mycelia* were inoculated in the solid medium on a clean bench. After the inoculation, the mushroom was rooted into the solid medium through incubation at 25° C. for 25 days. The culture vessel was knocked 10 times and treated at 50° C. for 36 hours to induce the mushroom mycelia into autolysis. The autolysates thus formed were pressed in a squeezer to give 1.1 liters of a filtrate. The paste left after the squeezing was dried with hot wind to produce 300 g of a powder. The 1.1 liters of the filtrate was concentrated to 600 mL by heating at 100° C. for 20 min.

Experimental Example 2
Culturing of Mushroom Mycelia in a Solid Medium Containing Glutinous Rice and Production of Autolysate Using glutinous rice, a culture medium was prepared, inoculated with *Coriolus versicolor mycelia*, and applied for producing a liquid concentrate and powder of *Coriolus versicolor mycelial* autolysates in a manner similar to that of Example 1. The glutinous rice was used in the amount of 500 g in 1.5 liters of water. The finally obtained concentrate and powder were 500 mL and 350 g in volume and mass, respectively.

Experimental Example 3
Culturing of Mushroom Mycelia in a Solid Medium Containing Barley and Production of Autolysate Using barley, a culture medium was prepared, inoculated with *Coriolus versicolor mycelia*, and applied for producing a liquid concentrate and powder of *Coriolus versicolor mycelial* autolysates in a manner similar to that of Example 1. The barley was used in the amount of 500 g in 1.5 liters of water. The finally obtained concentrate and powder were 550 mL and 330 g in volume and mass, respectively.

Experimental Example 4
Culturing of Mushroom Mycelia in a Solid Medium Containing Wheat and Production of Autolysate Using wheat, a culture medium was prepared, inoculated with *Coriolus versicolor mycelia*, and applied for producing a liquid concentrate and powder of *Coriolus versicolor mycelial* autolysates in a manner similar to that of Example 1. The wheat was used in the amount of 500 g in 1.5 liters of water. The finally obtained concentrate and powder were 600 mL and 300 g in volume and mass, respectively.

Experimental Example 5
Culturing of Mushroom Mycelia in a Solid Medium Containing Millet and Production of Autolysate Using barley, a culture medium was prepared, inoculated with *Coriolus versicolor mycelia*, and applied for producing a liquid concentrate and powder of *Coriolus versicolor mycelial* autolysates in a manner similar to that of Example 1. The wheat was used in the amount of 500 g in 1.5 liters of water. The finally obtained concentrate and powder were 550 mL and 350 g in volume and mass, respectively.

Experimental Example 6
Culturing of Mushroom Mycelia in a Solid Medium Containing *Glutinous sorghum* and Production of Autolysate Using glutinous sorghum, a culture medium was prepared, inoculated with *Coriolus versicolor mycelia*, and applied for producing a liquid concentrate and powder of *Coriolus versicolor mycelial* autolysates in a manner similar to that of Example 1. The glutinous sorghum was used in the amount of 500 g in 1 liter of water. The finally obtained concentrate and powder were 400 mL and 350 g in volume and mass, respectively.

Experimental Example 7
Culturing of Mushroom Mycelia in a Solid Medium Containing Glutinous Hog Millet and Production of Autolysate Using glutinous hog millet, a culture medium was prepared, inoculated with *Coriolus versicolor mycelia*, and applied for producing a liquid concentrate and powder of *Coriolus versicolor mycelial* autolysates in a manner similar to that of Example 1. The glutinous hog millet was used in the amount of 500 g in 1 liter of water. The finally obtained concentrate and powder were 400 mL and 350 g in volume and mass, respectively.

Experimental Example 8
Culturing of Mushroom Mycelia in a Solid Medium Containing Job's-tears and Production of Autolysate Using Job's-tears, a culture medium was prepared, inoculated with *Coriolus versicolor mycelia*, and applied for producing a liquid concentrate and powder of *Coriolus versicolor mycelial* autolysates in a manner similar to that of Example 1. The Job's-tears were used in the amount of 500 g in 1 liter. The finally obtained concentrate and powder were 500 mL and 330 g in volume and mass, respectively.

Experimental Example 9
Culturing of Mushroom Mycelia in a Solid Medium Containing Red Bean and Production of Autolysate Using red bean, a culture medium was prepared, inoculated with *Coriolus versicolor mycelia*, and applied for producing a liquid concentrate and powder of *Coriolus versicolor mycelial* autolysates in a manner similar to that of Example 1. The red bean was used in the amount of 500 g in 1 liter of water. The finally obtained concentrate and powder were 400 mL and 350 g in volume and mass, respectively.

Experimental Example 10
Culturing of Mushroom Mycelia in a Solid Medium Containing Beans and Production of Autolysate Using beans, a culture medium was prepared, inoculated with *Coriolus versicolor mycelia*, and applied for producing a liquid concentrate and powder of *Coriolus versicolor mycelial* autolysates in a manner similar to that of Example 1. The beans were used in the amount of 500 g in 2 liter of water. The finally obtained concentrate and powder were 500 mL and 300 g in volume and mass, respectively.

Experimental Example 11
Culturing of Mushroom Mycelia in a Solid Medium Containing Corn and Production of Autolysate Using corn, a culture medium was prepared, inoculated with *Coriolus versicolor mycelia*, and applied for producing a liquid concentrate and powder of *Coriolus versicolor mycelial* autolysates in a manner similar to that of Example 1. The corn was used in the amount of 500 g in 1 liter of water. The finally obtained concentrate and powder were 400 mL and 350 g in volume and mass, respectively.

EXAMPLE 2

Mushroom/Grain Gruel and Preparation Thereof

Mushroom/grain gruel was prepared from the autolysates of mushroom mycelia and the lysates of grains.

Figure 2:
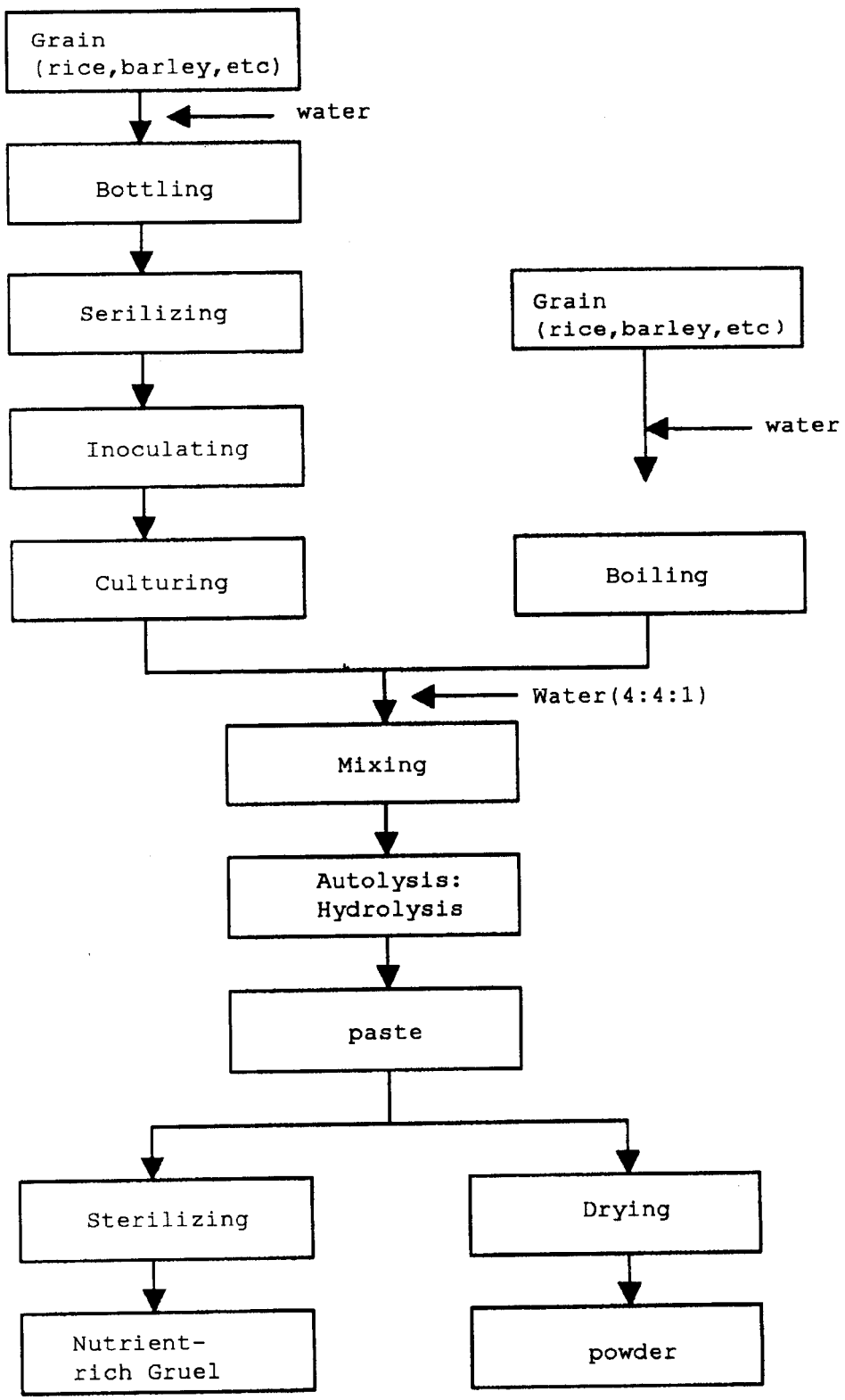
FIG. 2 is a flow chart illustrating the preparation of mushroom/grain-gruels.

The preparation of such mushroom/grain gruel is illustrated in FIG. 2.

First Step
Preparation of Solid Media from Grains

Rice was boiled or soaked in two or three equivalents of water. The boiled or soaked rice was placed in a culture vessel which was then sealed and sterilized by autoclaving for 15 to 30 min. The vessel was cooled in order to use the rice as a solid medium.

Instead of rice, rice, glutinous rice, barley, wheat, millet, glutinous sorghum, glutinous hog millet, Job's-tears, red bean, beans and corn were used for the preparation of solid media for culturing mushroom mycelia in the present invention. Any culture vessel could be used, but preferable is a bottle-shaped vessel.

Second Step
Inoculating and Culturing of Mushroom Mycelia

On a clean bench, mushroom mycelia were inoculated into the sterilized culture medium. The inoculum were taken from an agar plate or a broth. The inoculated mushroom mycelia were cultured in an incubator maintained at 20 to 30° C. for 15 to 30 days.

Exemplified by *Coriolus versicolor*, *Ganoderma lucidum*, *Schizophyllum commune*, *Peurotus ostreatus*, *Peurotus sajor-caju*, *Lentinus edodes* (Berk), *Flammulina velutipes*, *Auricularia* spp., and *Pholiota nameko*, any mushroom may be used in the present invention if it is edible and has medicinal properties.

Third Step
Mixing of Mushroom Mycelia with Boiled Grains

The mushroom mycelia which rooted into the solid medium in the second process, a grain boiled in water, and water were mixed in the proportions of 4:4:1. In this regard, any grain could be used. The boiling of the rice was conducted at 80 to 100° C. for 15 to 45 min.

Fourth Step
Induction of Mushroom Mycelia to Undergo Autolysis and Grains to Undergo Hydrolysis The mixture of mushroom mycelia with the grain of the third process was treated at 60° C. for 16 hours to induce the autolysis of the mushroom mycelia and the hydrolysis of the grains, simultaneously.

Fifth Step
Preparation of Gruel or Powder of Mushroom Mycelia and Grain

The autolysates of the mushroom mycelia and the lysates of the grains were treated at 80° C. for 30 min to give a mushroom/grain-gruel. Further, this gruel was dried with hot wind to produce a powder.

The gruel or powder obtained according to the process shown in FIG. 2 was rich in nutrients and could be used as a health food.

In the autolysates of mushroom mycelia obtained according to the present invention were present anti-tumorigenic polysaccharides such as exopolysaccharides and β-D-glucan, as well as scores of hydrolytic enzymes, such as cellulases, laccases, lipases, polygalactouronases, proteases, and the like. The lysates of grains produced as a result of the catalytic action of the enzymes are very easy to digest, so that the gruel or powder is useful as a health food for old and feeble persons.

Various gruels and powders were prepared as in the following experimental examples.

EXPERIMENTAL EXAMPLE 1

Preparation of Mushroom/Rice-Gruel and Powder 500 g of rice was boiled in 1 liter of water. 1.3 kg of the boiled rice was placed in a culture vessel and autoclaved for 20 min. *Ganoderma lucidum* mycelia were inoculated in the solid medium on a clean bench. After the inoculation, the mushroom was rooted into the solid medium through incubation at 25° C. for 25 days. This mushroom culture was mixed with 1.1 kg of boiled rice, which was obtained by boiling 500 g of rice in 0.6 liters of water, and 0.3 liters of water, followed by incubation at 60° C. for 16 hours to induce the autolysis of the mushroom mycelia and the hydrolysis of the grain. The paste thus obtained was treated at 80° C. for 30 min to give a nutrient-rich gruel. Alternatively, the paste was dried with hot wind to produce 800 g of powder.

EXPERIMENTAL EXAMPLE 2

Preparation of Mushroom/Glutinous Rice-Gruel and Powder

Using glutinous rice, a culture medium was prepared, inoculated with *Genoderma lucidum*, and applied for producing a nutrient-rich gruel and a powder in a manner similar to that of Experimental Example 1. The glutinous rice was used in the amount of 1 kg in 1.7 liters of water. The finally obtained powder was 830 g in mass.

EXPERIMENTAL EXAMPLE 3

Preparation of Mushroom/Barley-Gruel and Powder

Using barley, a culture medium was prepared, inoculated with *Genoderma lucidum*, and applied for producing a nutrient-rich gruel and a powder in a manner similar to that of Experimental Example 1. The barley was used in the amount of 1 kg in 1.5 liters of water. The finally obtained powder was 790 g in mass.

EXPERIMENTAL EXAMPLE 4

Preparation of Mushroom/Wheat-Gruel and Powder

Using wheat, a culture medium was prepared, inoculated with *Genoderma lucidum*, and applied for producing a nutrient-rich gruel and a powder in a manner similar to that of Experimental Example 1. The wheat was used in the amount of 1 kg in 1.5 liters of water. The finally obtained powder was 770 g in mass.

EXPERIMENTAL EXAMPLE 5

Preparation of Mushroom/Millet-Gruel and Powder

Using millet, a culture medium was prepared, inoculated with *Genoderma lucidum*, and applied for producing a nutrient-rich gruel and a powder in a manner similar to that of Experimental Example 1. The millet was used in the amount of 1 kg in 1.6 liters of water. The finally obtained powder was 800 g in mass.

EXPERIMENTAL EXAMPLE 6

Preparation of Mushroom/glutinous Sorghum-Gruel and Powder

Using glutinous sorghum, a culture medium was prepared, inoculated with *Genoderma lucidum*, and applied for producing a nutrient-rich gruel and a powder in a manner similar to that of Experimental Example 1. The glutinous sorghum was used in the amount of 1 kg in 1.5 liters of water. The finally obtained powder was 780 g in mass.

EXPERIMENTAL EXAMPLE 7

Preparation of Mushroom/glutinous Hog Millet-Gruel and Powder

Using glutinous hog millet, a culture medium was prepared, inoculated with *Genoderma lucidum*, and applied for producing a nutrient-rich gruel and a powder in a manner similar to that of Experimental Example 1. The glutinous hog millet was used in the amount of 1 kg in 1.6 liters of water. The finally obtained powder was 790 g in mass.

EXPERIMENTAL EXAMPLE 8

Preparation of Mushroom/Job's-tearsGruel and Powder

Using Job's-tears, a culture medium was prepared, inoculated with *Genoderma lucidum*, and applied for producing a nutrient-rich gruel and a powder in a manner similar to that of Experimental Example 1. The Job's-tears were used in the amount of 1 kg in 1.6 liters of water. The finally obtained powder was 780 g in mass.

EXPERIMENTAL EXAMPLE 9

Preparation of Mushroom/Red Bean-Gruel and Powder

Using red bean, a culture medium was prepared, inoculated with *Genoderma lucidum*, and applied for producing a nutrient-rich gruel and a powder in a manner similar to that of Experimental Example 1. The red bean was used in the amount of 1 kg in 1.5 liters of water. The finally obtained powder was 770 g in mass.

EXPERIMENTAL EXAMPLE 10

Preparation of Mushroom/beans-Gruel and Powder

Using beans, a culture medium was prepared, inoculated with *Genoderma lucidum*, and applied for producing a nutrient-rich gruel and a powder in a manner similar to that of Experimental Example 1. The beans were used in the amount of 1 kg in 4 liters of water. The finally obtained powder was 750 g in mass.

EXPERIMENTAL EXAMPLE 11

Preparation of Mushroom/Corn-Gruel and Powder

Using corn, a culture medium was prepared, inoculated with *Genoderma lucidum*, and applied for producing a nutrient-rich gruel and a powder in a manner similar to that of Experimental Example 1. The corn was used in the amount of 1 kg in 1.6 liters of water. The finally obtained powder was 800 g.

As described hereinbefore, edible or medicinal mushroom mycelia cultured in solid media made of grains can be induced into autolysis in accordance with the present invention. The autolysates of mushroom mycelia are rich in antitumorigenic and other medicinally useful materials, so that they can be processed into very useful foods or medicines.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing products from cultured mushroom mycelia, comprising the steps of:

preparing a solid medium by boiling or soaking a grain in 2 or 3 equivalents of water, placing the grain in a culture vessel, autoclaving and cooling the grain;

inoculating a mushroom mycelium in an incubator at 20 to 30° C. for 15 to 30 days to root the mushroom mycelium into the solid medium;

inducing autolysis of the mushroom mycelium grown into the grain substrate medium by treating the culture vessel at 45 to 55° C. for 24 to 48 hours; squeezing the autolysate to produce a liquid and concentrating the liquid; and drying the paste to a powder, wherein the paste is the solid extract from which the liquid is removed.

2. The method as set forth in claim 1, wherein the grain is selected from the group consisting of rice, barley, wheat, millet, sorghum, Job's-tears, beans and corn.

3. The method as set forth in claim 1, wherein the mushroom mycelium is selected from the group consisting of *Coriolus versicolor, Ganoderma lucidum, Schizophyilum commune, Pieurotus ostreatus, Pleurotus sajor-caju, Lentinus edodes* (Berk), *Flammulina velutipes*, Auricularia spp., and *Pholiota nameko*.

4. A method for preparing a gruel from a mixture of a grain and autolysed mushroom mycelium, comprising the steps of:

preparing a solid medium by boiling or soaking a grain in 2 to 3 weights of water, placing the grain in a culture vessel, autoclaving and cooling the grain;

inoculating a mushroom mycelium into the solid medium and culturing the mushroom mycelium in an incubator at 20 to 30° C. for 15 to 30 days to root the mushroom mycelium into the solid medium;

mixing the mushroom culture, the grain, and water in proportions of 4:4:1;

incubating the mixture at 60° C. for 16 hours to induce the autolysis of the mushroom mycelium and the hydrolysis of the grain, simultaneously; and heating the autolysates and hydrolysates at 80° C. for 30 mm to give a gruel.

5. A method for preparing a powder from a dried mixture of a grain and autolysed mushroom mycelium, comprising the steps of:

preparing a solid medium by boiling or soaking a grain in 2 to 3 weights of water, placing the grain in a culture vessel, autoclaving and cooling the grain;

inoculating a mushroom mycelium into the solid medium and culturing the mushroom mycelium in an incubator at 20 to 30° C. for 15 to 30 days to root the mushroom mycelium into the solid medium;

mixing the mushroom culture, the grain, and water in proportions of 4:4:1;

incubating the mixture at 60° C. for 16 hours to induce the autolysis of the mushroom mycelium and the hydrolysis of the grain, simultaneously;

heating the autolysates and hydrolysates at 80° C. for 30 mm to give a gruel; and drying the gruel with hot air to produce a gruel powder.

6. The method as set forth in claim 4, wherein the grain is selected from the group consisting of rice, barley, wheat, millet, sorghum, Job's-tears, beans and corn.

7. The method as set forth in claim 4, wherein the mushroom mycelium is selected from the group consisting of *Coriolus versicolor, Ganoderma lucidum, Schizophyllum commune, Pleurotus ostreatus, Pleurotus sajor-caju, Lentinus edodes* (Berk) *Flammulina velutipes*, Auricularia spp., and *Pholiota nameko*.

* * * * *

UNITED STATES PATENT AND TRADEMARK OFFICE
CERTIFICATE OF CORRECTION

PATENT NO.     : 6,569,475 B2
DATED          : May 27, 2003
INVENTOR(S)    : Song et al.

It is certified that error appears in the above-identified patent and that said Letters Patent is hereby corrected as shown below:

Column 8,
Line 16, after "*Ganoderma lucidum*," please replace "*Schizophyilum*" with
-- *Schizophyllum* --.
Line 17, after "*commune*" and before "*ostreatus*," please replace "*Pieurotus*" with
-- *Pleurotus* --.
Lines 37 and 55, before "to give a gruel" please replace "mm" with -- min --.
Line 64, after "(Berk)" and before "*Flammulina*", please insert -- , --.

Signed and Sealed this

Sixteenth Day of September, 2003

JAMES E. ROGAN
*Director of the United States Patent and Trademark Office*